(12) United States Patent
Yu (10) Patent No.: US 10,959,159 B2
(45) Date of Patent: Mar. 23, 2021

(54) SERVICE SET STEERING BASED UPON DEVICE IDENTIFIER

(71) Applicant: ARRIS Enterprises LLC, Suwanee, GA (US)

(72) Inventor: Haokeng Yu, Shenzhen (CN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/552,091

(22) PCT Filed: Dec. 19, 2016

(86) PCT No.: PCT/CN2016/110851
§ 371 (c)(1),
(2) Date: Aug. 18, 2017

(87) PCT Pub. No.: WO2018/112712
PCT Pub. Date: Jun. 28, 2018

(65) Prior Publication Data
US 2019/0357115 A1      Nov. 21, 2019

(51) Int. Cl.
*H04W 48/04* (2009.01)
*H04W 8/00* (2009.01)
(Continued)

(52) U.S. Cl.
CPC .......... *H04W 48/04* (2013.01); *H04W 8/005* (2013.01); *H04W 8/24* (2013.01); *H04W 48/14* (2013.01); *H04W 48/16* (2013.01)

(58) Field of Classification Search
CPC ..... H04W 48/04; H04W 48/14; H04W 8/005; H04W 8/24; H04W 48/16
See application file for complete search history.

(56) References Cited

U.S. PATENT DOCUMENTS

2004/0237100 A1* 11/2004 Pinder ............... H04N 21/43637
725/31
2008/0198826 A1*  8/2008 Won ....................... H04W 24/02
370/338
(Continued)

FOREIGN PATENT DOCUMENTS

CN        104113915 A      10/2014
CN        104871598 A       8/2015
(Continued)

OTHER PUBLICATIONS

PCT International Search Report, Re: Application No. PCT/CN2016/110851, dated Sep. 26, 2017.
(Continued)

*Primary Examiner* — Andrew Lai
*Assistant Examiner* — Sumitra Ganguly
(74) *Attorney, Agent, or Firm* — Wenderoth, Lind & Ponack, L.L.P.

(57) ABSTRACT

Methods, systems, and computer readable media can be operable to facilitate the configuration of a device with service set information based upon an identified association between the device and a private service set. An access device may retrieve and store identifiers of private client devices associated with the access device and identifiers of private client devices associated with neighboring access devices. The access device may retrieve the private client device identifiers from neighboring access devices or from an upstream network element or server. When a client device attempts to associate with a service set offered by the access device, the access device may preclude the client device from associating with a public service set if an identifier of the client device matches a private client device identifier stored at the access device.

9 Claims, 8 Drawing Sheets

(51) Int. Cl.
*H04W 8/24* (2009.01)
*H04W 48/14* (2009.01)
*H04W 48/16* (2009.01)

(56) References Cited

U.S. PATENT DOCUMENTS

| | | | | |
|---|---|---|---|---|
| 2009/0046644 | A1* | 2/2009 | Krishnaswamy | ............................ H04W 12/0609 370/329 |
| 2011/0274037 | A1* | 11/2011 | Jain | ....................... H04W 8/085 370/328 |
| 2013/0318572 | A1* | 11/2013 | Singh | ...................... H04L 47/10 726/4 |
| 2015/0245278 | A1* | 8/2015 | Scahill | .................. H04W 48/02 370/329 |
| 2016/0044036 | A1 | 2/2016 | Bestermann et al. | |
| 2016/0241452 | A1* | 8/2016 | Ringland | ................ H04L 45/24 |

FOREIGN PATENT DOCUMENTS

| | | |
|---|---|---|
| CN | 105282819 A | 1/2016 |
| WO | 2015044634 A1 | 4/2015 |

OTHER PUBLICATIONS

Extended European Search Report dated Jul. 15, 2020 in European Application No. 16924228.6.

* cited by examiner

SERVICE SET STEERING BASED UPON DEVICE IDENTIFIER

TECHNICAL FIELD

This disclosure relates to service set steering based upon an identification of a client device.

BACKGROUND

One or more access points may be installed at a subscriber premise to provide a subscriber with a local network such as a wireless local area network (WLAN) for accessing multiple services that are delivered to the subscriber premise. An access point may provide a plurality of service sets wherein each service set is designated for use to provide certain services. For example, service sets may be designated for delivery of encrypted communications over a password-protected, private network, communications associated with a specific service (e.g., video, data, voice, security, etc.), or communications associated with a public network (e.g., unencrypted or encrypted hotspot network).

Generally, the delivery of communications over a private service set of an access device is prioritized over the delivery of communications over a public service set of the access device. When a client device attempts to associate with an access device, the client device may join a public service set offered by the access device rather than a private service set offered by the access device. Thus, a user may not receive the full benefits of an access device when a client device is associated with the public service set of the access device.

Further, where subscriber premises are densely populated (e.g., in a multiple dwelling unit (MDU), urban area, etc.), a client device may be within the wireless range of one or more access devices located in neighboring premises. These access devices within the neighboring premises may offer public service sets with which a client device may associate. Therefore, a client device may join a public service set of a neighboring access device rather than a private service set offered by an access device that is located in the same premise as the client device, thus causing a user to receive a lower service quality than would be received if the client device was associated with a private service set.

Therefore, it is desirable to improve upon methods and systems for configuring a client device to associate with an access device on a desired service set.

BRIEF DESCRIPTION OF THE DRAWINGS

Like reference numbers and designations in the various drawings indicate like elements.

DETAILED DESCRIPTION

Methods, systems, and computer readable media can be operable to facilitate the configuration of a device with service set information based upon an identified association between the device and a private service set. An access device may retrieve and store identifiers of private client devices associated with the access device and identifiers of private client devices associated with neighboring access devices. The access device may retrieve the private client device identifiers from neighboring access devices or from an upstream network element or server. When a client device attempts to associate with a service set offered by the access device, the access device may preclude the client device from associating with a public service set if an identifier of the client device matches a private client device identifier stored at the access device.

An embodiment of the invention described herein may include a method comprising: (a) receiving, at a first access device, a communication from a client device; (b) retrieving from the communication, an identifier associated with the client device; (c) comparing the identifier associated with the client device to one or more private client device identifiers, wherein the one or more private client device identifiers comprise identifiers associated with one or more client devices that are associated with one or more other access devices as private client devices; and (d) if the identifier associated with the client device matches a private client device identifier of the one or more private client device identifiers, precluding the client device from associating with a public service set offered by the first access device.

According to an embodiment of the invention, the one or more private client device identifiers are retrieved by the first access device and stored at the first access device.

According to an embodiment of the invention, the first access device retrieves the one or more private client device identifiers by: (a) outputting a probe request; (b) receiving one or more probe responses from the one or more other access devices, wherein the one or more probe responses comprise the one or more private client device identifiers; and (c) extracting the one or more private client device identifiers from the one or more probe responses.

According to an embodiment of the invention, the first access device retrieves the one or more private client device identifiers by: (a) receiving one or more messages from an upstream network element, wherein the one or more messages comprise the one or more private client device identifiers; and (b) extracting the one or more private client device identifiers from the one or more messages.

According to an embodiment of the invention, the upstream network element comprises a headend device.

According to an embodiment of the invention, the one or more private client device identifiers carried by the one or more messages comprise only those private client device identifiers associated with one or more access devices that are within a predetermined proximity of the first access device.

According to an embodiment of the invention, the proximity of the first access device and each of the other one or more access devices is based upon location information of a subscriber premise associated with the first access device and location information of a subscriber premise associated with each of the other one or more access devices.

An embodiment of the invention described herein may include an access device comprising: (a) one or more interfaces configured to be used to receive a communication from a client device; and (b) one or more modules configured to: (i) retrieve from the communication, an identifier associated with the client device; (ii) compare the identifier associated with the client device to one or more private client device identifiers, wherein the one or more private client device identifiers comprise identifiers associated with one or more client devices that are associated with one or more other access devices as private client devices; and (iii) if the identifier associated with the client device matches a private client device identifier of the one or more private client device identifiers, preclude the client device from associating with a public service set offered by the access device.

An embodiment of the invention described herein may include one or more non-transitory computer readable media having instructions operable to cause one or more processors to perform the operations comprising: (a) receiving, at a first access device, a communication from a client device; (b) retrieving from the communication, an identifier associated with the client device; (c) comparing the identifier associated with the client device to one or more private client device identifiers, wherein the one or more private client device identifiers comprise identifiers associated with one or more client devices that are associated with one or more other access devices as private client devices; and (d) if the identifier associated with the client device matches a private client device identifier of the one or more private client device identifiers, precluding the client device from associating with a public service set offered by the first access device.

Figure 1:
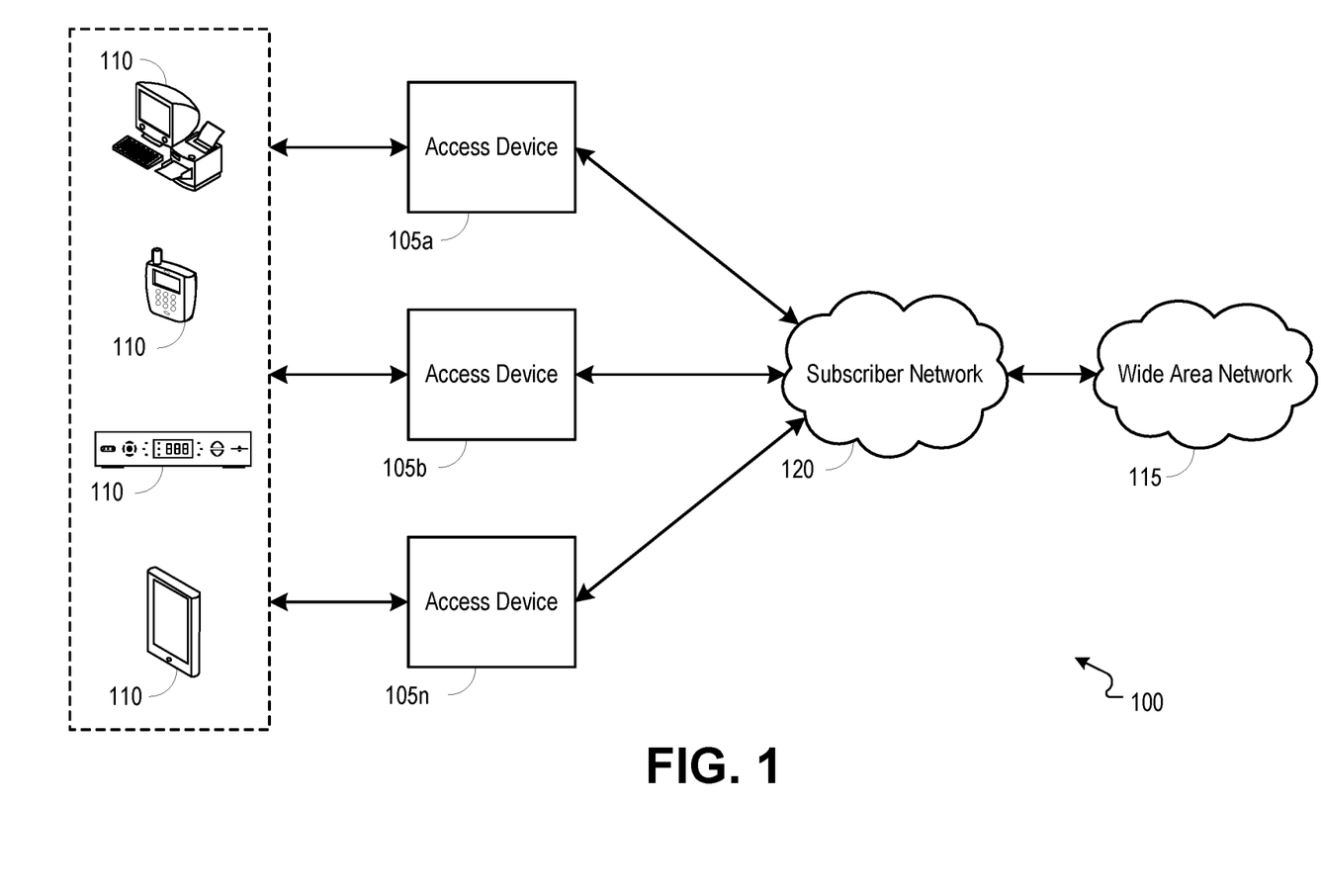
FIG. 1 is a block diagram illustrating an example network environment operable to facilitate the configuration of a device with service set information based upon an identified association between the device and a private service set.

FIG. 1 is a block diagram illustrating an example network environment 100 operable to facilitate the configuration of a device with service set information based upon an identified association between the device and a private service set. In embodiments, an access device 105 can route communications to and from one or more client devices 110. For example, the one or more client devices 110 can be provisioned to receive video service(s), data service(s), voice service(s), home security service(s), and/or other services through one or more access devices 105. In embodiments, an access device 105 can include a gateway, a cable modem, a wireless router including an embedded cable modem, a mobile hot-spot router, a multimedia over coaxial alliance (MoCA) node, a wireless extender, and any access point or other device that is operable to route communications to and from a client device 110.

In embodiments, client devices 110 may include a wide variety of devices such as televisions, mobile devices, tablets, set-top boxes, computers, telephones, security devices, and any other device that is capable of utilizing a wireless video, data, telephony, or security service. In embodiments, an access device 105 can provide one or more service sets (e.g., primary service set(s), subordinate service set(s), guest service set(s), data service set(s), video service set(s), etc.), and the service sets can be identified using unique service set identifiers (SSID) and/or an inclusion of an interworking informational element in an advertisement of the capabilities for the service set. For example, an access device 105 may advertise an available service set by outputting a radio signal including an SSID associated with the service set and other information that may be used by a client device 105 to join the service set. One or more access devices 105 may provide a local network (e.g., local area network (LAN), wireless local area network (WLAN), personal area network (PAN), etc.) for carrying communications between the access device(s) 105 and one or more associated client devices 110.

In embodiments, a client device 110 can identify a service set that is advertised by an access device 105, and the client device 110 may be configured to utilize the identified service set provided by the access device 105. Once a client device 110 is configured for communicating with an access device 105 through an identified service set, the client device 110 can receive content and/or services from upstream networks or servers (e.g., wide area network (WAN) 115), and can communicate with other client devices 110 connected through the same service set if the service set is configured to allow such a communication. When searching for a service set with which to associate, the client device 110 may identify a plurality of service sets that are offered by one or more access devices 105a-n of which the client device 110 is within a wireless range. For example, the client device 110 may identify service sets that are offered by access devices located in neighboring premises.

In embodiments, an access device 105 can route communications between client device(s) 110 and a WAN 115 via a subscriber network 120. The subscriber network 120 can include various networks such as Ethernet (e.g., CAT5/CAT6), coaxial cable, optical fiber, twisted pair network, satellite networks, mobile networks including 4G and LTE, and others.

Once authenticated with a service set offered by an access device 105, a client device 110 may communicate with the access device 105 over a wireless channel associated with the access device 105. For example, a requested service (e.g., data, video, telephony, home security, etc.) may be provided to a client device 110 using bandwidth available on the wireless channel.

In embodiments, each access device 105 (e.g., access devices 105a-n) may provide one or more service sets with which a client device 110 may be associated. For example, one or more primary service sets may be used to deliver primary services (e.g., private, encrypted communications, gaming, video, home security, etc.), and one or more subordinate service set(s) may be used to deliver subordinate services (e.g., public or hotspot service sets facilitating unencrypted or encrypted network communications and other optional services). Association of a client device 110 with a private service set (e.g., home or residential service set, encrypted service set, home security service set, home automation service set, data/video/gaming service set, Internet of things (IoT) service set, extender/bridge service set, etc.) may require entry of a passcode or passphrase, whereas association of a client device 110 with a public service set (e.g., hotspot service set, unencrypted service set, guest service set, etc.) may not require entry of a passcode or passphrase. It should be understood that the access devices 105a-n may be located within a single subscriber premise or the access devices 105a-n may be located within a plurality of different subscriber premises. For example, the access devices 105a-n may be located within different, neighboring subscriber premises (e.g., such as subscriber premises within a multiple dwelling unit (MDU) or densely populated area).

In embodiments, an access device 105 may generate and maintain a list of identifiers of private client devices. Private client devices may include those client devices that are designated for accessing a private service set of an access device 105. For example, private client devices may include those client devices that are currently or have previously been associated with a private service set of an access device 105. It should be understood that an access device 105 may generate and maintain a list of identifiers of private client devices associated with the access device 105 and identifiers of private client devices associated with other (i.e., neighboring) access devices (e.g., other of the access devices 105a-n). It should be understood that a private service set may include those service sets offered by an access device 105a-n as a private service set, and the access devices 105a-n may be configured to designate a service set as a private service set when the service set is an encrypted service set (i.e., the service set requires a passcode/passphrase or other credential for association of a client device 110 with the service set).

In embodiments, an access device 105 may output one or more probe requests along channels available to the access device 105. The probe requests may include an identifier of the access device 105 (e.g., MAC (media access control) address, vendor information within a packet prefix, etc.), and the probe requests may be received by one or more other access devices (e.g., access devices 105a-n) that are within a wireless range of the access device 105. The other access devices may be configured to recognize the access device 105 as the source of the probe request, and in response, the other access devices may output a probe response to the access device 105, wherein the probe response includes identifiers of one or more private client devices that are associated with the other access devices. The access device 105 may receive the one or more probe responses, extract the private client device identifiers from the probe responses, and store the private client device identifiers within a list of identifiers associated with client devices that are to be precluded from associating with a public service set.

In embodiments, an access device 105 may retrieve identifiers of private client devices associated with one or more neighboring access devices from an upstream network element or server. An upstream network element or server (e.g., headend device such as a CMTS (cable modem termination system)) may periodically query and/or retrieve identifiers of private client devices from access devices configured to communicate with the upstream network element or server. The upstream network element or server may store private client device identifiers that are associated with one or more access devices, and the upstream network element or server may store geographical or network location information associated with each of the access devices. The upstream network element or server may periodically, or in response to a request from an access device, output to an access device 105, one or more messages carrying the private client device identifiers associated with the one or more access devices. In embodiments, the upstream network element or server may include only those private client device identifiers associated with access devices neighboring (e.g., based on the location information associated with the access devices) a target access device in messages output to the target access device. The access device 105 may receive the one or more messages from the upstream network element or server, extract the private client device identifiers from the messages, and store the private client device identifiers within a list of identifiers associated with client devices that are to be precluded from associating with a public service set.

In embodiments, a client device 110 (i.e., enrollee or station) may initiate a communication exchange with an access device 105. The access device 105 may identify the client device 110 based on identification information carried by the communication (e.g., a MAC address or other identifier of the client device 110). The access device 105 may compare the identifier of the client device 110 to one or more identifiers associated with client devices designated as private client devices. For example, the access device 105 may maintain a list of identifiers of private client devices associated with the access device 105 and identifiers of private client devices associated with one or more neighboring access devices (e.g., access devices 105a-n). If the identifier of the client device 110 matches an identifier of a private client device, the access device 105 may preclude the client device 110 from associating with a public service set offered by the access device 105. If the identifier of the client device 110 does not match an identifier of a private client device, the access device 105 may allow the client device 110 to associate with a public service set offered by the access device 105.

Figure 2:
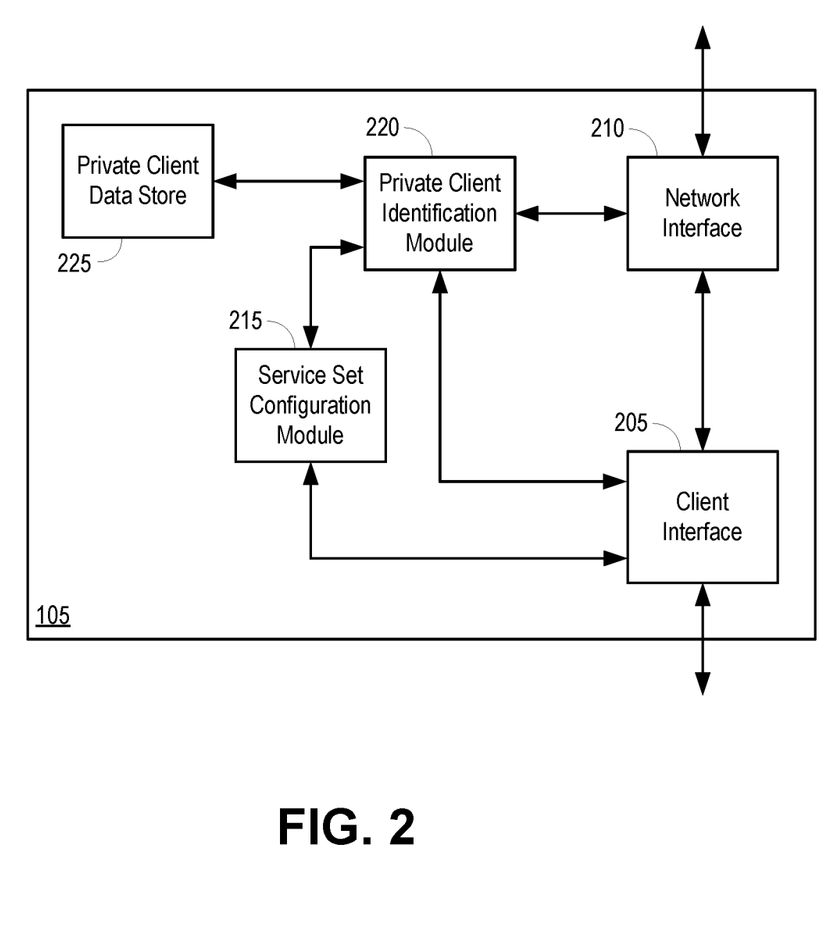
FIG. 2 is a block diagram illustrating an example access device operable to facilitate the configuration of a device with service set information based upon an identified association between the device and a private service set.

FIG. 2 is a block diagram illustrating an example access device 105 operable to facilitate the configuration of a device with service set information based upon an identified association between the device and a private service set. The access device 105 may include a client interface 205, a network interface 210, a service set configuration module 215, a private client identification module 220, and a private client data store 225. The access device 105 may provide one or more services to one or more client devices (e.g., client devices 110 of FIG. 1), and one or more services may be received at the access device 105 from an upstream network or local network through the network interface 210. Communications between the access device 105 and one or more client devices 110 may be output from or received through the client interface 205. The client interface 205 may include a receiver and/or transmitter configured to output and receive wireless communications (e.g., 802.11 communications) over one or more wireless networks.

In embodiments, the access device 105 may route communications to and from client devices 110 through one or more service sets and one or more of the service sets may be designated for the provision of one or more services. For example, one or more primary service sets may be used to deliver primary services (e.g., private, encrypted communications, gaming, video, home security, etc.), and one or more subordinate service set(s) may be used to deliver subordinate services (e.g., public or hotspot service sets facilitating unencrypted or encrypted network communications and other optional services). Association of a client device 110 with a private service set may require entry of a passcode or passphrase, whereas association of a client device 110 with a public service set may not require entry of a passcode or passphrase.

In embodiments, the private client identification module 220 may generate and maintain a list of identifiers of private client devices. Private client devices may include those client devices that are designated for accessing a private service set of an access device. For example, private client devices may include those client devices that are currently or have previously been associated with a private service set of an access device 105. It should be understood that the private client identification module 220 may generate and maintain a list of identifiers of private client devices associated with the access device 105 and identifiers of private client devices associated with other (i.e., neighboring) access devices (e.g., other of the access devices 105*a-n*).

In embodiments, the access device 105 may output one or more probe requests along channels available to the access device 105. The probe requests may include an identifier of the access device 105 (e.g., MAC (media access control) address, vendor information within a packet prefix, etc.), and the probe requests may be received by one or more other access devices (e.g., access devices 105*a-n*) that are within a wireless range of the access device 105. The other access devices may be configured to recognize the access device 105 as the source of the probe request, and in response, the other access devices may output a probe response to the access device 105, wherein the probe response includes identifiers of one or more private client devices that are associated with the other access devices. The private client identification module 220 may receive the one or more probe responses, extract the private client device identifiers from the probe responses, and store the private client device identifiers at the private client data store 225 within a list of identifiers associated with client devices that are to be precluded from associating with a public service set.

In embodiments, the access device 105 may retrieve identifiers of private client devices associated with one or more neighboring access devices from an upstream network element or server. An upstream network element or server (e.g., headend device such as a CMTS (cable modem termination system)) may periodically query and/or retrieve identifiers of private client devices from access devices configured to communicate with the upstream network element or server. The upstream network element or server may store private client device identifiers that are associated with one or more access devices, and the upstream network element or server may store geographical or network location information associated with each of the access devices. The upstream network element or server may periodically, or in response to a request from an access device, output to the access device, one or more messages carrying the private client device identifiers associated with the one or more access devices. In embodiments, the upstream network element or server may include only those private client device identifiers associated with access devices neighboring (e.g., based on the location information associated with the access devices) a target access device in messages output to the target access device. The private client identification module 220 may receive the one or more messages from the upstream network element or server, extract the private client device identifiers from the messages, and store the private client device identifiers at the private client data store 225 within a list of identifiers associated with client devices that are to be precluded from associating with a public service set.

In embodiments, a client device 110 (i.e., enrollee or station) may initiate a communication exchange with the access device 105. The private client identification module 220 may identify the client device 110 based on identification information carried by the communication (e.g., a MAC address or other identifier of the client device 110). The private client identification module 220 may compare the identifier of the client device 110 to one or more identifiers associated with client devices designated as private client devices (e.g., the identifiers stored at the private client data store 225). If the identifier of the client device 110 matches an identifier of a private client device, the access device 105 may preclude the client device 110 from associating with a public service set offered by the access device 105. For example, the service set configuration module 215 may deny a request from the client device 110 to associate with a public service set. If the identifier of the client device 110 does not match an identifier of a private client device, the access device 105 may allow the client device 110 to associate with a public service set offered by the access device 105. For example, the service set configuration module 215 may determine configuration information (e.g., service set identifier (SSID), authentication type, encryption type, passphrase or pre shared key, etc.) for a public service set, and may then initiate a configuration of the client device 110 utilizing WLAN configuration commands.

Figure 3:
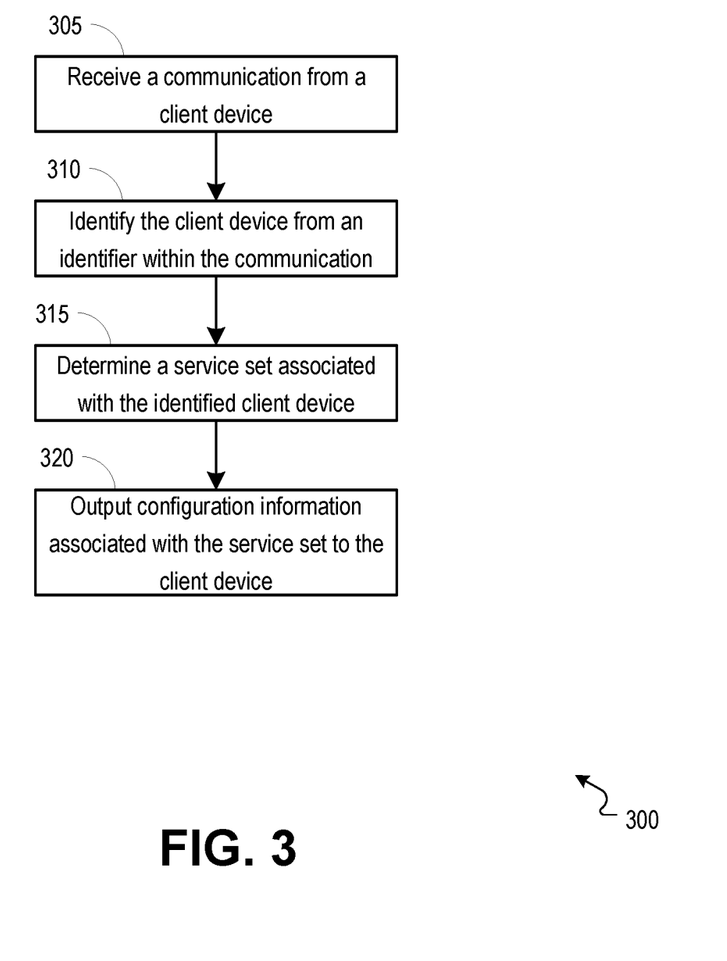
FIG. 3 is a flowchart illustrating an example process operable to facilitate the configuration of a device with information for a service set based upon an identification of the device.

FIG. 3 is a flowchart illustrating an example process 300 operable to facilitate the configuration of a device with information for a service set based upon an identification of the device. In embodiments, the process 300 may be carried out by an access device 105 of FIG. 1 or a remote server (e.g., registrar external to an access point or other server configured to store associations between service sets and devices). The process 300 may start at 305, when a communication is received from a device. The communication may be a communication that is transmitted from a client device 110 of FIG. 1 during an attempt by the client device 110 to associate with an access device 105. For example, the communication may be a message requesting access to a service set provided by the access device 105.

At 310, the device from which the communication is received may be identified based upon an identifier carried by the communication. The device may be identified, for example, by an access device 105 (e.g., by a private client identification module 220 of FIG. 2). The identifier may be any of various communication components serving to provide a unique identification of a source device (e.g., the client device 110 from which the communication is received). For example, the private client identification module 220 may identify the device using a MAC (media access control) address carried by the received communication.

At 315, a service set associated with the identified device may be determined. The service set associated with the identified device may be determined, for example, by the access device 105 (e.g., by the private client identification module 220) or a registrar or server external to the access device 105. In embodiments, the access device 105 may maintain a device-service set association history (e.g., at a private client data store 225 of FIG. 2). For example, the access device 105 may store identifiers (e.g., MAC addresses) of one or more client devices 110 that have been successfully associated with a certain services set (e.g., private service set) of the access device 105 or another access device 105. It should be understood that the access device 105 may store an association between one or more device identifiers and one or more service sets, and the access device 105 may utilize the stored associations to determine a service set associated with the identified device.

At 320, configuration information associated with the service set may be transmitted to the client device. Configuration information may be output from an access device 105 (e.g., by the service set configuration module 215 through the client interface 205 of FIG. 2) to the client device from which the communication was received. In embodiments, the configuration information may include an identification of a specific WLAN BSS (basic service set) and corresponding SSID, authentication type, encryption type, and passphrase or pre-shared key. The configuration information associated with the service set may be stored at the access device 105 (e.g., at the service set configuration module 215) or at an external registrar or server. The client device may be configured for communicating over the determined service set through an exchange of WLAN configuration commands between the access device 105 and the client device. For example, the access device 105 may instruct the client device 110 to select a service set configuration profile associated with the determined service set or the access device 105 may deliver a service set configuration profile associated with the determined service set during an association procedure between the client device 110 and access device 105.

Figure 4:
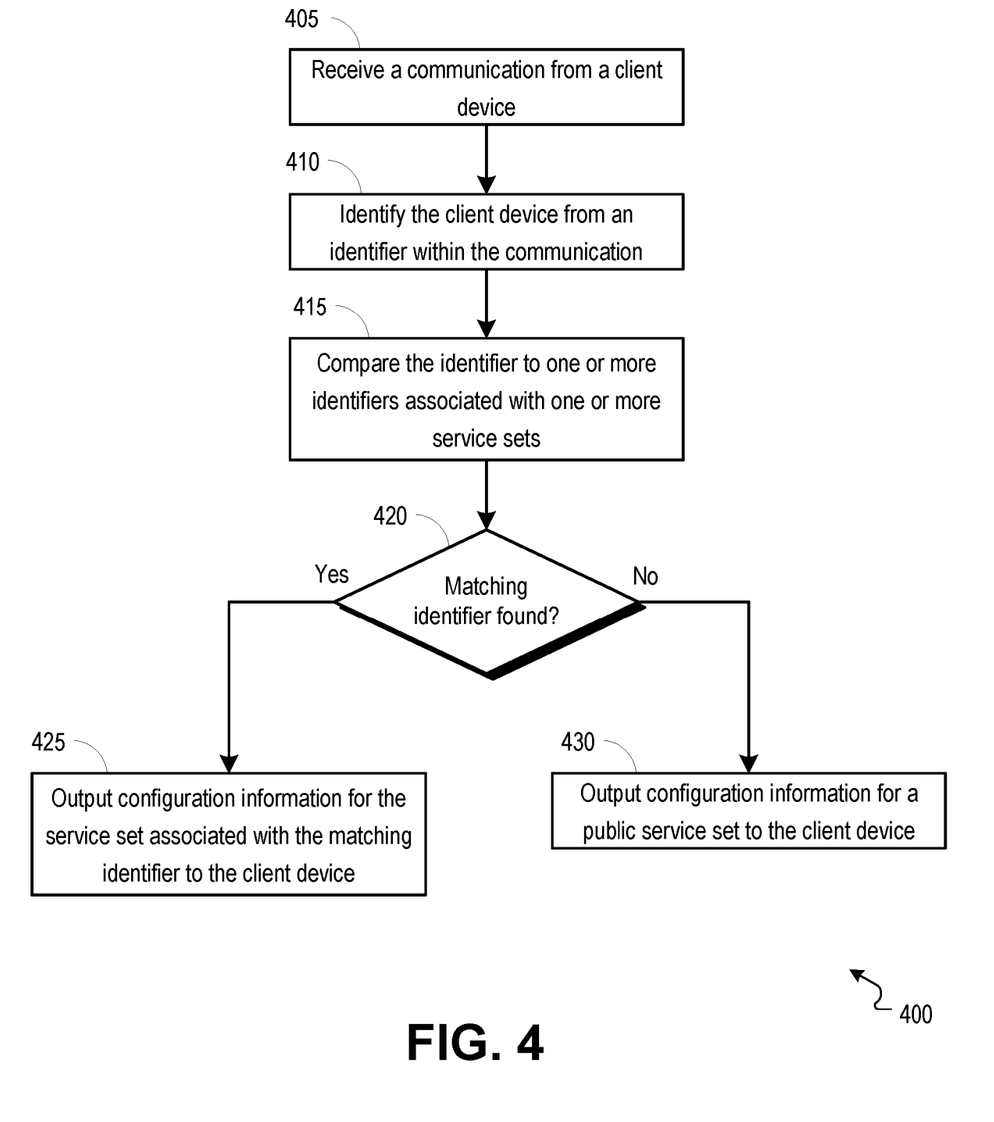
FIG. 4 is a flowchart illustrating an example process operable to facilitate the configuration of a device with information for a service set based upon a comparison between an identifier of the device and one or more device identifiers associated with one or more service sets.

FIG. 4 is a flowchart illustrating an example process 400 operable to facilitate the configuration of a device with information for a service set based upon a comparison between an identifier of the device and one or more device identifiers associated with one or more service sets. In embodiments, the process 400 may be carried out by an access device 105 of FIG. 1 or a remote server (e.g., registrar external to an access point or other server configured to store associations between service sets and device identifiers). The process 400 may start at 405, when a communication is received from a device. The communication may be a communication that is transmitted from a client device 110 of FIG. 1 during an attempt by the client device 110 to associate with an access device 105. For example, the communication may be a message requesting access to a service set (e.g., a public service set) provided by the access device 105, and the communication may be output from the client device 110 in response to an identification of the service set as a service set offered by the access device 105.

At 410, the device from which the communication is received may be identified based upon an identifier carried by the communication. The device may be identified, for example, by an access device 105 (e.g., by a private client identification module 220 of FIG. 2). The identifier may be any of various communication components serving to provide a unique identification of a source device (e.g., the client device 110 from which the communication is received). For example, the private client identification module 220 may identify the device using a MAC (media access control) address carried by the received communication.

At 415, the device identifier may be compared to one or more device identifiers that are associated with one or more service sets. The comparison between the device identifier and one or more device identifiers that are associated with one or more service sets may be made, for example, by a private client identification module 220 of FIG. 2. In embodiments, the device identifier may be compared to identifiers within a group of device identifiers (e.g., group of device identifiers stored at the private client data store 225 of FIG. 2), wherein each identifier within the group of device identifiers is associated with one or more service sets. For example, the access device 105 may store identifiers (e.g., MAC addresses) of one or more client devices 110 that have been successfully associated with a certain service set (e.g., private service set) of the access device 105 or another access device 105.

At 420, a determination may be made whether the device identifier matches any of the one or more stored device identifiers. The determination whether a matching device identifier is found amongst the one or more stored device identifiers may be made, for example, by a private client identification module 220 of FIG. 2. In embodiments, the private client identification module 220 may search a list of device identifiers (e.g., device identifiers stored at a private client data store 225 of FIG. 2) for a device identifier that matches the identifier that was identified from the received communication.

If, at 420, a matching device identifier is found, the process 400 may proceed to 425. At 425, configuration information for a service set associated with the matching device identifier may be output to the client device. When a matching device identifier is found, the determination may be made that the device from which the communication was received is to be configured to communicate via the service set associated with the matching device identifier. For example, when the device identifier is found within a list of identifiers associated with devices that have been previously associated with a private service set, the access device 105 may determine that the client device is to be associated with the private service set that is offered by the access device 105 or another access device 105. Configuration information may be output from an access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the service set may be stored at the access device 105 (e.g., at the service set configuration module 215) or at an external registrar or server. The client device may be configured for communicating over the determined service set through an exchange of WLAN configuration commands between the access device 105 and the client device.

If, at 420, a matching device identifier is not found, the process 400 may proceed to 430. At 430, configuration information for a public service set may be output to the client device. When a matching device identifier is not found, the determination may be made that the client device has not been previously associated with a private service set offered by the access device 105 or another associated access device 105. Therefore, the access device 105 may determine that the client device may be permitted to associate with a public service set and the client device may be configured to communicate with the access device 105 through a public service set. Configuration information may be output from the access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. It should be understood that the public service set may not be encrypted and may not require entry of a passphrase or pre-shared key. The configuration information associated with the public service set may be stored at the access device 105 (e.g., at the service set configuration module 215) or at an external registrar or server. The client device may be configured for communicating over the public service set through an exchange of WLAN configuration commands between the access device 105 and the client device.

Figure 5:
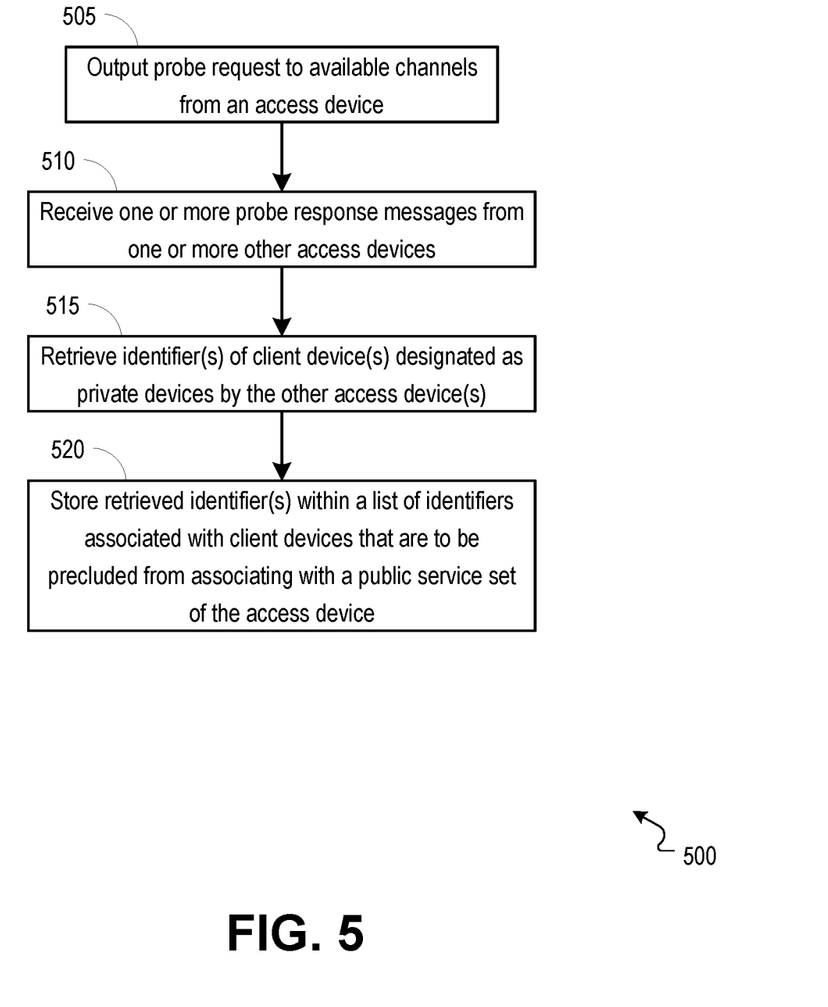
FIG. 5 is a flowchart illustrating an example process operable to facilitate the generation of a list of devices that are to be precluded from associating with a public service set.

FIG. 5 is a flowchart illustrating an example process 500 operable to facilitate the generation of a list of devices that are to be precluded from associating with a public service set. In embodiments, the process 500 may be carried out by an access device 105 of FIG. 1. The process 500 may start at 505, when one or more probe requests are output to available channels from an access device 105. In embodiments, the access device 105 may output a probe request (e.g., WLAN or Wi-Fi probe request) along each of the channels available to the access device 105. The probe request may include one or more wireless capabilities of the access device 105 and may be configured to request a response from any other access device that receives the probe request. The probe request may include an identifier of the access device 105 (e.g., vendor information within a MAC address prefix of the probe request).

At 510, the access device 105 may receive one or more probe response messages from one or more other access devices. In embodiments, the probe requests output from the access device 105 may be received by one or more other access devices that are within a wireless range of the access device 105, and the one or more other access devices may respond to the probe request by outputting a probe response to the access device 105. The one or more other access devices may be configured to determine that the probe request was transmitted by another access device based upon identifying information carried by the probe request (e.g., vendor information within a MAC address prefix of the probe request). The one or more other access devices may identify the access device 105 as the device from which the probe requests were output, and each respective access device of the one or more other access devices may generate a probe response that includes an identifier of the respective access device (e.g., a MAC address) and identifiers (e.g., MAC addresses) of each of one or more client devices that are currently or that have previously been associated with the respective access device as a private client device. For example, each of the one or more other access devices may maintain a list of client devices that have been associated with the access device as a private client device (e.g., client devices previously or currently associated with a private service set offered by the respective access device).

At 515, the access device 105 may retrieve one or more identifiers of one or more client devices that are designated as private devices by the one or more other access devices from which a probe response was received. The one or more identifiers may be retrieved, for example, by the private client identification module 220 of FIG. 2. In embodiments, the private client identification module 220 may retrieve the one or more identifiers (e.g., MAC addresses) of the one or more client devices designated as private devices from the one or more probe responses received from the one or more other access devices.

At 520, the one or more retrieved identifiers may be stored within a list of identifiers associated with client devices that are to be precluded from associating with a public service set of the access device 105. The one or more retrieved identifiers may be stored, for example, at a private client data store 225. In embodiments, when the access device 105 receives an association request from a client device, the access device 105 may check an identifier of the client device against the one or more identifiers stored within the private client data store 225, and if the identifier of the client device is found within the private client data store 225, the access device 105 may preclude the client device from associating with a public service set that is offered by the access device 105.

Figure 6:
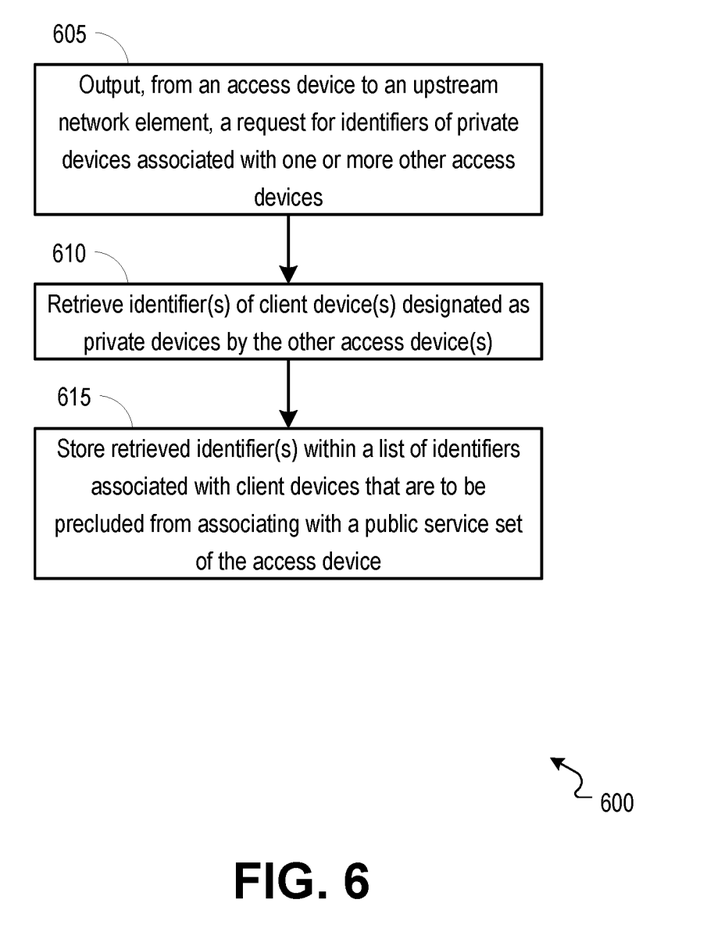
FIG. 6 is a flowchart illustrating an example process operable to facilitate the retrieval of identifiers of one or more client devices that are to be precluded from associating with a public service set.

FIG. 6 is a flowchart illustrating an example process 600 operable to facilitate the retrieval of identifiers of one or more client devices that are to be precluded from associating with a public service set. In embodiments, the process 600 may be carried out by an access device 105 of FIG. 1. The process 600 may start at 605 when a request for identifiers of private devices associated with one or more other access devices is output from an access device 105 to an upstream network element. The access device 105 may periodically or conditionally (e.g., upon a boot of the access device 105) output a request for private device identifiers to an upstream network element or server. For example, the request may be output to an upstream headend device (e.g., CMTS (cable modem termination system)).

At 610, the access device 105 may retrieve identifiers of one or more client devices designated as private devices by one or more other access devices. The identifiers may be retrieved, for example, by a private client identification module 220 of FIG. 2 from one or more messages received from an upstream network element or server. In embodiments, the upstream network element or server may maintain a list of private client devices that are or that have been associated with access devices receiving one or more services from the upstream network element or server. For example, an upstream network element or server such as a headend device may service a plurality of access devices that are close in geographical proximity with each other, and a subset of these access devices may be access devices that are located in neighboring premises such that the access devices are within a wireless range of each other. The upstream network element or server may query or receive a list of private client device identifiers (e.g., identifiers such as MAC addresses of client devices that are of that have been associated with an access device) from each of the one or more access devices serviced by the upstream network element or server. In response to the request for identifiers of private client devices received from the access device 105, the upstream network element or server may output one or messages to the access device 105, the one or more messages carrying the private client device identifiers associated with each of the one or more access devices. In embodiments, based on geographical or network positions of the various access devices, the upstream network element or server may identify those access devices that may be neighboring devices to the access device 105 (e.g., those access devices that are within a predetermined proximity of the access device 105), and the upstream network element or server may send only those private client device identifiers associated with neighboring access devices to the access device 105.

At 615, the one or more retrieved identifiers may be stored within a list of identifiers associated with client devices that are to be precluded from associating with a public service set of the access device 105. The one or more retrieved identifiers may be stored, for example, at a private client data store 225. In embodiments, when the access device 105 receives an association request from a client device, the access device 105 may check an identifier of the client device against the one or more identifiers stored within the private client data store 225, and if the identifier of the client device is found within the private client data store 225, the access device 105 may preclude the client device from associating with a public service set that is offered by the access device 105.

Figure 7:
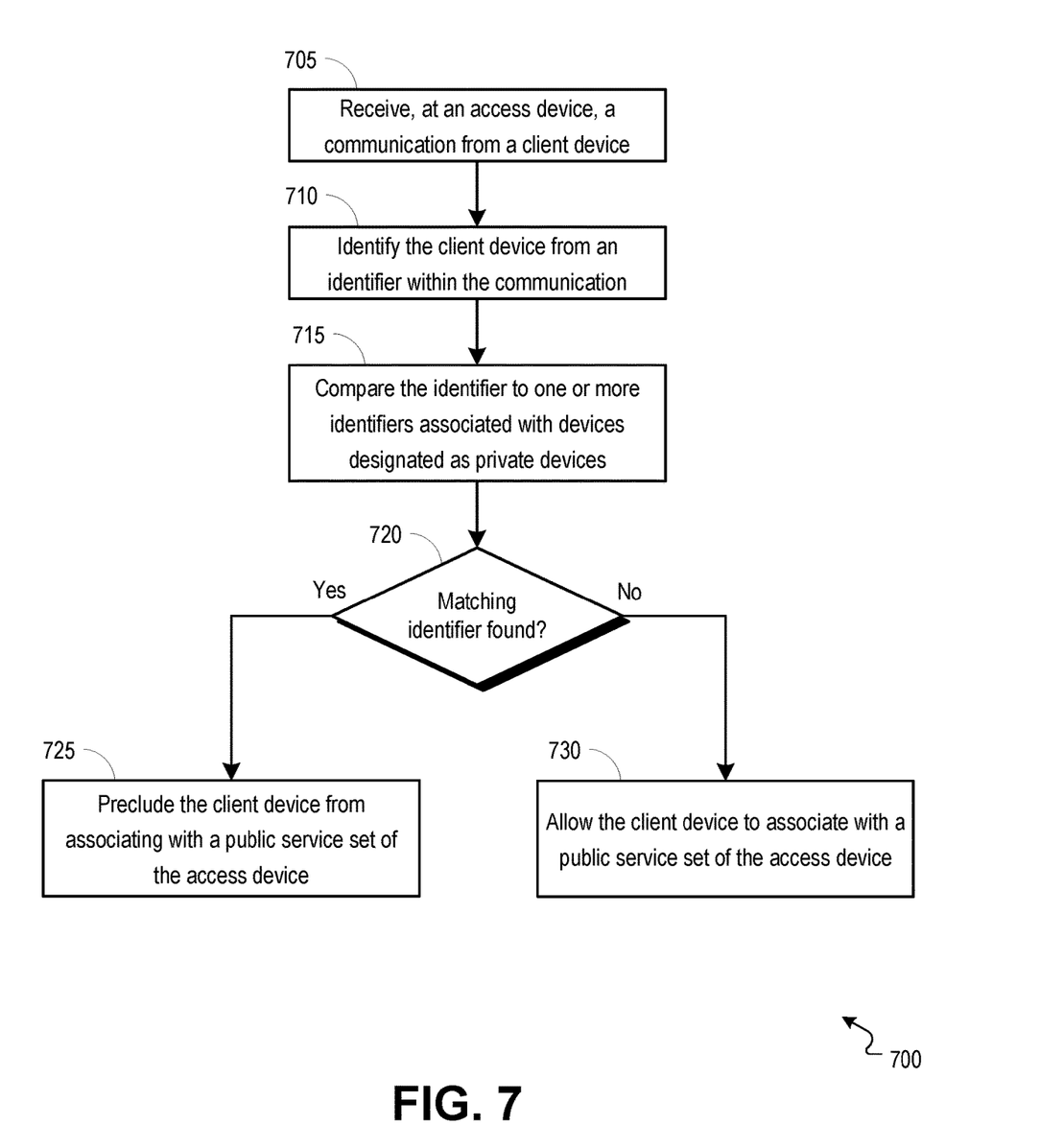
FIG. 7 is a flowchart illustrating an example process operable to facilitate service set steering based upon a determination whether a client device is designated as a private client device.

FIG. 7 is a flowchart illustrating an example process 700 operable to facilitate service set steering based upon a determination whether a client device is designated as a private client device. In embodiments, the process 700 may be carried out by an access device 105 of FIG. 1. The process 700 may start at 705, when a communication is received from a device. The communication may be a communication that is transmitted from a client device 110 of FIG. 1 during an attempt by the client device 110 to associate with an access device 105. For example, the communication may be a message requesting access to a service set (e.g., a public service set) provided by the access device 105, and the communication may be output from the client device 110 in response to an identification of the service set as a service set offered by the access device 105.

At 710, the device from which the communication is received may be identified based upon an identifier carried by the communication. The device may be identified, for example, by an access device 105 (e.g., by a private client identification module 220 of FIG. 2). The identifier may be any of various communication components serving to provide a unique identification of a source device (e.g., the client device 110 from which the communication is received). For example, the private client identification module 220 may identify the device using a MAC (media access control) address carried by the received communication.

At 715, the device identifier may be compared to one or more device identifiers that are designated as private devices. The comparison between the device identifier and one or more device identifiers that are designated as private devices may be made, for example, by a private client identification module 220 of FIG. 2. In embodiments, the device identifier may be compared to identifiers within a group of device identifiers (e.g., group of device identifiers stored at the private client data store 225 of FIG. 2), wherein each identifier within the group of device identifiers is associated with a private client device. For example, the access device 105 may store identifiers (e.g., MAC addresses) of one or more client devices 110 that have been successfully associated with a certain service set (e.g., private service set) of the access device 105 or another access device 105. It should be understood that the access device 105 may retrieve (e.g., from other access devices or an upstream network element or server) private client device identifiers that are associated with neighboring access devices (e.g., access devices that may be within a wireless range of the access device 105), and the retrieved private client device identifiers may be stored at a private client data store 225 of FIG. 2.

At 720, a determination may be made whether the device identifier matches any of the one or more stored device identifiers. The determination whether a matching device identifier is found amongst the one or more stored device identifiers may be made, for example, by a private client identification module 220 of FIG. 2. In embodiments, the private client identification module 220 may search a list of private client device identifiers (e.g., device identifiers stored at a private client data store 225 of FIG. 2) for a device identifier that matches the identifier that was identified from the received communication.

If, at 720, a matching device identifier is found, the process 700 may proceed to 725. At 725, the client device may be precluded from associating with a public service set that is offered by the access device 105. In embodiments, the access device 105 may deny a request from the client device to join a public service set that is offered by the access device 105. For example, the access device 105 may output a message to the client device denying the client device's request to join a public service set.

If, at 720, a matching device identifier is not found, the process 700 may proceed to 730. At 730, the client device may be allowed to associate with a public service set of the access device. In embodiments, configuration information for a public service set may be output to the client device. When a matching device identifier is not found, the determination may be made that the client device has not been previously associated with a private service set offered by the access device 105 or another associated access device 105 (i.e., a neighboring access device). Therefore, the access device 105 may determine that the client device may be permitted to associate with a public service set and the client device may be configured to communicate with the access device 105 through a public service set. Configuration information may be output from the access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. It should be understood that the public service set may not be encrypted and may not require entry of a passphrase or pre-shared key. The configuration information associated with the public service set may be stored at the access device 105 (e.g., at the service set configuration module 215) or at an external registrar or server. The client device may be configured for communicating over the public service set through an exchange of WLAN configuration commands between the access device 105 and the client device.

Figure 8:
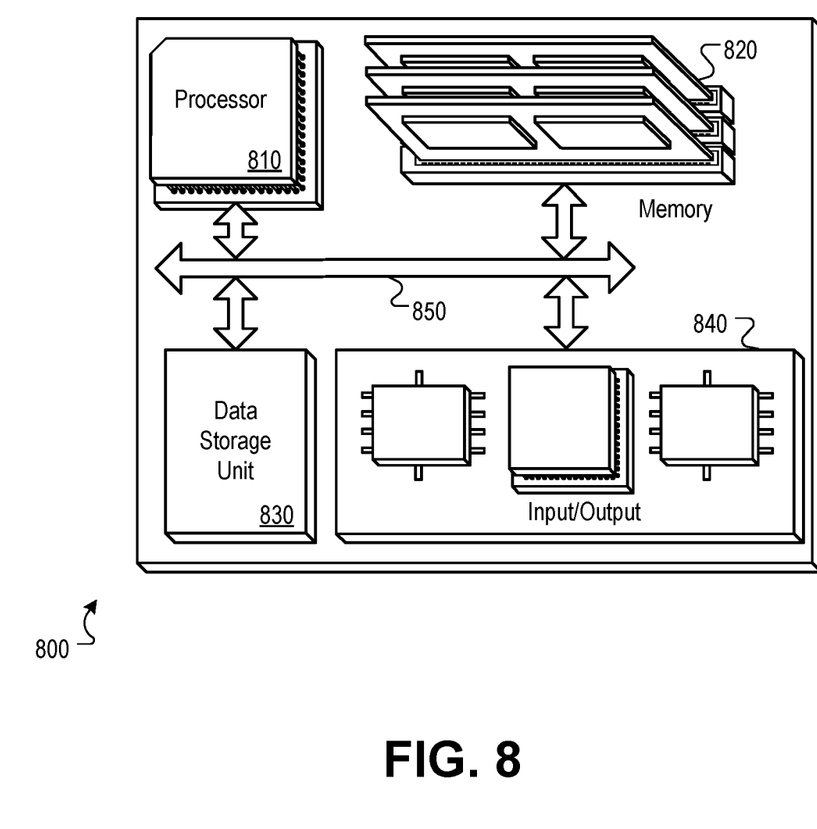
FIG. 8 is a block diagram of a hardware configuration operable to facilitate the configuration of a device with service set information based upon an identified association between the device and a private service set.

FIG. 8 is a block diagram of a hardware configuration 800 operable to facilitate the configuration of a device with service set information based upon an identified association between the device and a private service set. It should be understood that the hardware configuration 800 can exist in various types of devices. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 120 of FIG. 1, WAN 115 of FIG. 1, local network, etc.) and/or one or more access devices (e.g., access devices 105a-n of FIG. 1) and/or client devices (e.g., client devices 110 of FIG. 1) via one or more service sets. It should be understood that the communications protocols described herein are only examples and that various other inter-chip communication protocols may be used to support the methods, systems, and computer readable media described herein.

Those skilled in the art will appreciate that the invention improves upon methods and apparatuses for configuring devices with service set information. Methods, systems, and computer readable media can be operable to facilitate the configuration of a device with service set information based upon an identified association between the device and a private service set. An access device may retrieve and store identifiers of private client devices associated with the access device and identifiers of private client devices associated with neighboring access devices. The access device may retrieve the private client device identifiers from neighboring access devices or from an upstream network element or server. When a client device attempts to associate with a service set offered by the access device, the access device may preclude the client device from associating with a public service set if an identifier of the client device matches a private client device identifier stored at the access device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving, at a first access device, a communication from a client device, wherein the first access device provides at least a public service set;
   retrieving from the communication, an identifier associated with the client device;

comparing the identifier associated with the client device to one or more private client device identifiers, wherein the one or more private client device identifiers comprise identifiers associated with one or more client devices that are associated with one or more other access devices as private client devices, wherein the one or more other access devices provide one or more other service sets;

wherein the one or more private client device identifiers are retrieved by the first access device and stored at the first access device, the one or more private client device identifiers being retrieved by:

outputting a probe request from the first access device;

receiving one or more probe responses from the one or more other access devices, the one or more probe responses being received by the first access device, wherein the one or more probe responses comprise one or more private client device identifiers associated with client devices that are designated as private client devices by the one or more other access devices; and extracting the one or more private client device identifiers from the one or more probe responses; and if the identifier associated with the client device matches a private client device identifier of the one or more private client device identifiers, precluding the client device from associating with the public service set offered by the first access device.

2. The method of claim 1, wherein the one or more private client device identifiers carried by the one or more probe responses comprise only those private client device identifiers associated with one or more other access devices that are within a predetermined proximity of the first access device.

3. The method of claim 2, wherein the proximity of the first access device and each of the one or more other access devices is based upon location information of a subscriber premise associated with the first access device and location information of a subscriber premise associated with each of the one or more other access devices.

4. An access device providing at least a public service set, the access device comprising:

one or more interfaces configured to be used to receive a communication from a client device; and one or more modules configured to:

retrieve from the communication, an identifier associated with the client device;

compare the identifier associated with the client device to one or more private client device identifiers, wherein the one or more private client device identifiers comprise identifiers associated with one or more client devices that are associated with one or more other access devices as private client devices, wherein the one or more other access devices provide one or more other service sets;

wherein the one or more private client device identifiers are retrieved by the first access device and stored at the first access device, the one or more private client device identifiers being retrieved by:

outputting a probe request from the first access device;

receiving one or more probe responses from the one or more other access devices, the one or more probe responses being received by the first access device, wherein the one or more probe responses comprise one or more private client device identifiers associated with client devices that are designated as private client devices by the one or more other access devices; and extracting the one or more private client device identifiers from the one or more probe responses; and if the identifier associated with the client device matches a private client device identifier of the one or more private client device identifiers, preclude the client device from associating with the public service set offered by the access device.

5. The access device of claim 4, wherein the one or more private client device identifiers carried by the one or more probe responses comprise only those private client device identifiers associated with one or more other access devices that are within a predetermined proximity of the access device.

6. The access device of claim 5, wherein the proximity of the access device and each of the one or more other access devices is based upon location information of a subscriber premise associated with the access device and location information of a subscriber premise associated with each of the one or more other access devices.

7. One or more non-transitory computer readable media having instructions operable to cause one or more processors to perform the operations comprising:

receiving, at a first access device, a communication from a client device, wherein the first access device provides at least a public service set;

retrieving from the communication, an identifier associated with the client device;

comparing the identifier associated with the client device to one or more private client device identifiers, wherein the one or more private client device identifiers comprise identifiers associated with one or more client devices that are associated with one or more other access devices as private client devices, wherein the one or more other access devices provide one or more other service sets;

wherein the one or more private client device identifiers are retrieved by the first access device and stored at the first access device, the one or more private client device identifiers being retrieved by:

outputting a probe request from the first access device;

receiving one or more probe responses from the one or more other access devices, the one or more probe responses being received by the first access device, wherein the one or more probe responses comprise one or more private client device identifiers associated with client devices that are designated as private client devices by the one or more other access devices; and extracting the one or more private client device identifiers from the one or more probe responses; and if the identifier associated with the client device matches a private client device identifier of the one or more private client device identifiers, precluding the client device from associating with the public service set offered by the first access device.

8. The one or more non-transitory computer-readable media of claim 7, wherein the one or more private client device identifiers carried by the one or more probe responses comprise only those private client device identifiers associated with one or more other access devices that are within a predetermined proximity of the first access device.

9. The one or more non-transitory computer-readable media of claim 8, wherein the proximity of the first access device and each of the one or more other access devices is based upon location information of a subscriber premise associated with the first access device and location information of a subscriber premise associated with each of the one or more other access devices.

\* \* \* \* \*